United States Patent
Liu et al.

(10) Patent No.: US 8,042,124 B2
(45) Date of Patent: Oct. 18, 2011

(54) OPTICAL DISK DRIVE

(75) Inventors: Shi-Wei Liu, Taipei (TW); Chin-Cheng Lin, Taipei (TW); Ya-Lun Yang, Taipei (TW); Yen-Hsing Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 983 days.

(21) Appl. No.: 12/000,036

(22) Filed: Dec. 7, 2007

(65) Prior Publication Data
US 2008/0141292 A1    Jun. 12, 2008

(30) Foreign Application Priority Data

Dec. 8, 2006 (TW) ................................ 95146056 A (51) Int. Cl.
*G11B 17/056* (2006.01)
*G11B 33/14* (2006.01)

(52) U.S. Cl. ........................................................ 720/610
(58) Field of Classification Search ................. 720/610; 369/30.96
See application file for complete search history.

(56) References Cited

U.S. PATENT DOCUMENTS

| 6,266,312 | B1 * | 7/2001 | Akiba | 720/610 |
| 7,143,423 | B2 * | 11/2006 | Arase | 720/613 |
| 7,367,034 | B2 * | 4/2008 | Hara | 720/613 |
| 7,596,794 | B2 * | 9/2009 | Guo | 720/613 |
| 2003/0137917 | A1 * | 7/2003 | Hekizono | 369/75.2 |
| 2004/0107425 | A1 * | 6/2004 | Huang | 720/610 |
| 2007/0186220 | A1 * | 8/2007 | Omori et al. | 720/610 |

FOREIGN PATENT DOCUMENTS

| JP | 11353752 A | * | 12/1999 |
| JP | 2003-263818 A | | 9/2003 |
| TW | 505291 | * | 10/2002 |

* cited by examiner

*Primary Examiner* — Julie Anne Watko
(74) *Attorney, Agent, or Firm* — Bacon & Thomas, PLLC (57) ABSTRACT

An optical disk drive includes a body, a tray, a first fastening structure, and a second fastening structure. The body has an opening. The tray is coupled to the body and movable at the opening. The first fastening structure is disposed at the body, and the second fastening structure is disposed at the tray. When the tray is situated in the body, the first fastening structure and second fastening structure are correspondingly fastened to each other to restrict the displacement of the tray along the vertical direction in the body.

9 Claims, 7 Drawing Sheets

OPTICAL DISK DRIVE

This application claims the benefit of Taiwan application Serial No. 95146056, filed Dec. 8, 2006, the subject matter of which is incorporated herein by reference.

BACKGROUND OF THE INVENTION

1. Field of the Invention

The invention relates to an optical disk drive and, more particularly, to an optical drive which can restrict the displacement of a tray in a body along the vertical direction.

2. Description of the Related Art

Figure 1:
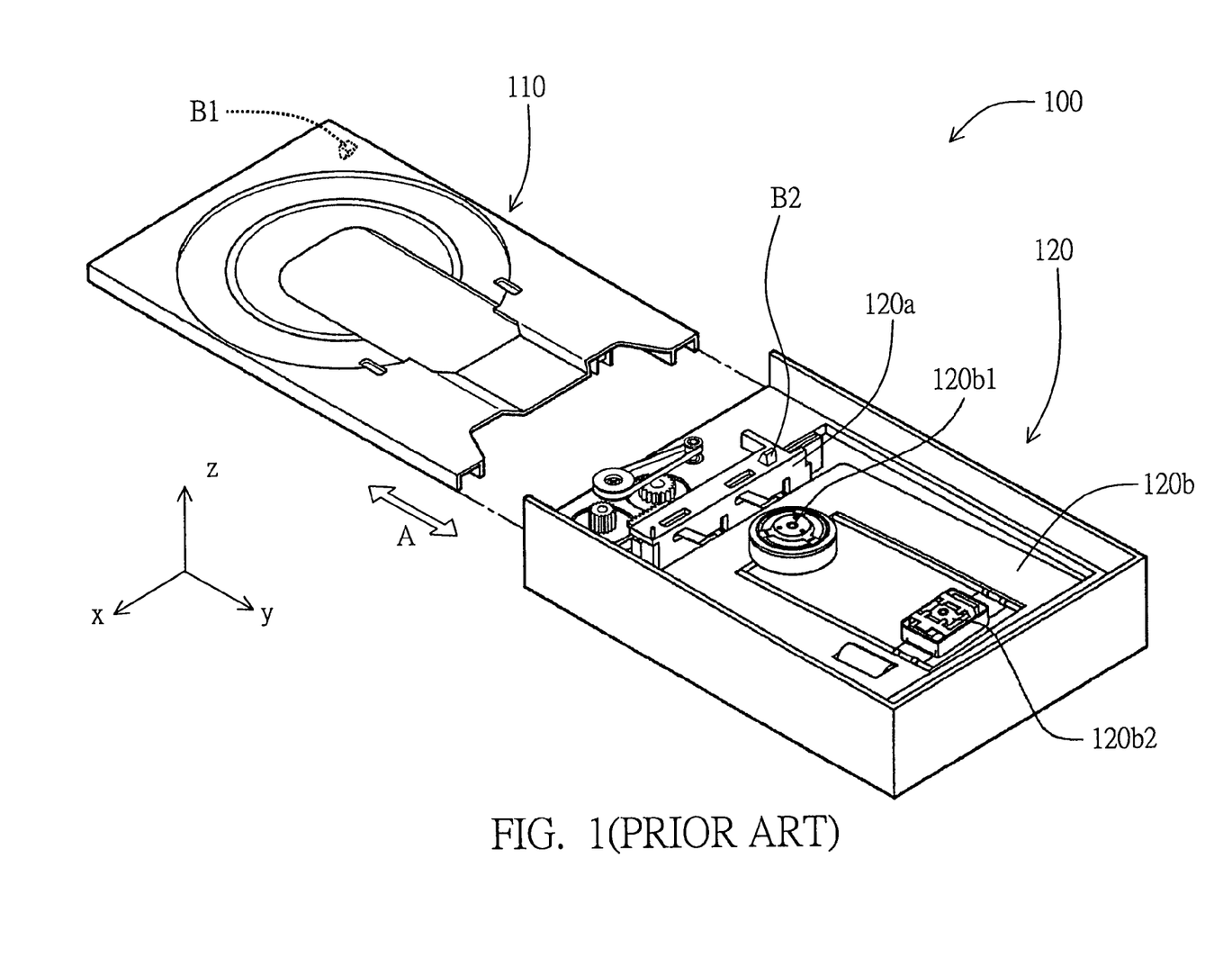
FIG. 1 is a structural schematic diagram showing a part of a conventional optical disk drive.

Please refer to FIG. 1, which is a structural schematic diagram showing a part of a conventional optical disk drive. The optical disk drive 100 includes a tray 110, a body 120 and two protrudent blocks B1 and B2. The body 120 includes a raiser 120a and a traverse 120b which are coupled to each other. The traverse 120b further includes a principal axis motor 120b1 and an optical reading head 120b2. The protrudent block B1 is provided at the back of the tray 110 (which is shown by the dotted line), and the protrudent block B2 is provided at the raiser 120a.

The tray 110 is used to carry the optical disk (not shown) putted by the user and can enter in the body 120 or be ejected from the body 120 along a parallel direction (which is parallel to the y axis) shown by the double-arrow symbol A in FIG. 1. In addition, the relative driving mechanism is used, and then the raiser 120a can cooperate with the movement of the tray 110 to move transversely right and left synchronously (that is, parallel to the x axis). At that moment, the side of the traverse 120b which is coupled to the raiser 120a can correspondingly move up or move down via the guiding track design of the raiser 120a. When the tray 110 shown in FIG. 1 enters in the body 120 toward the +y direction, the raiser 120a moves toward −x direction to make the protrudent block B2 move to the position whose x axis coordinate is same with that of the protrudent block B1 and abut against the protrudent block B1 when the tray 110 is in the body 120.

Figure 2A:
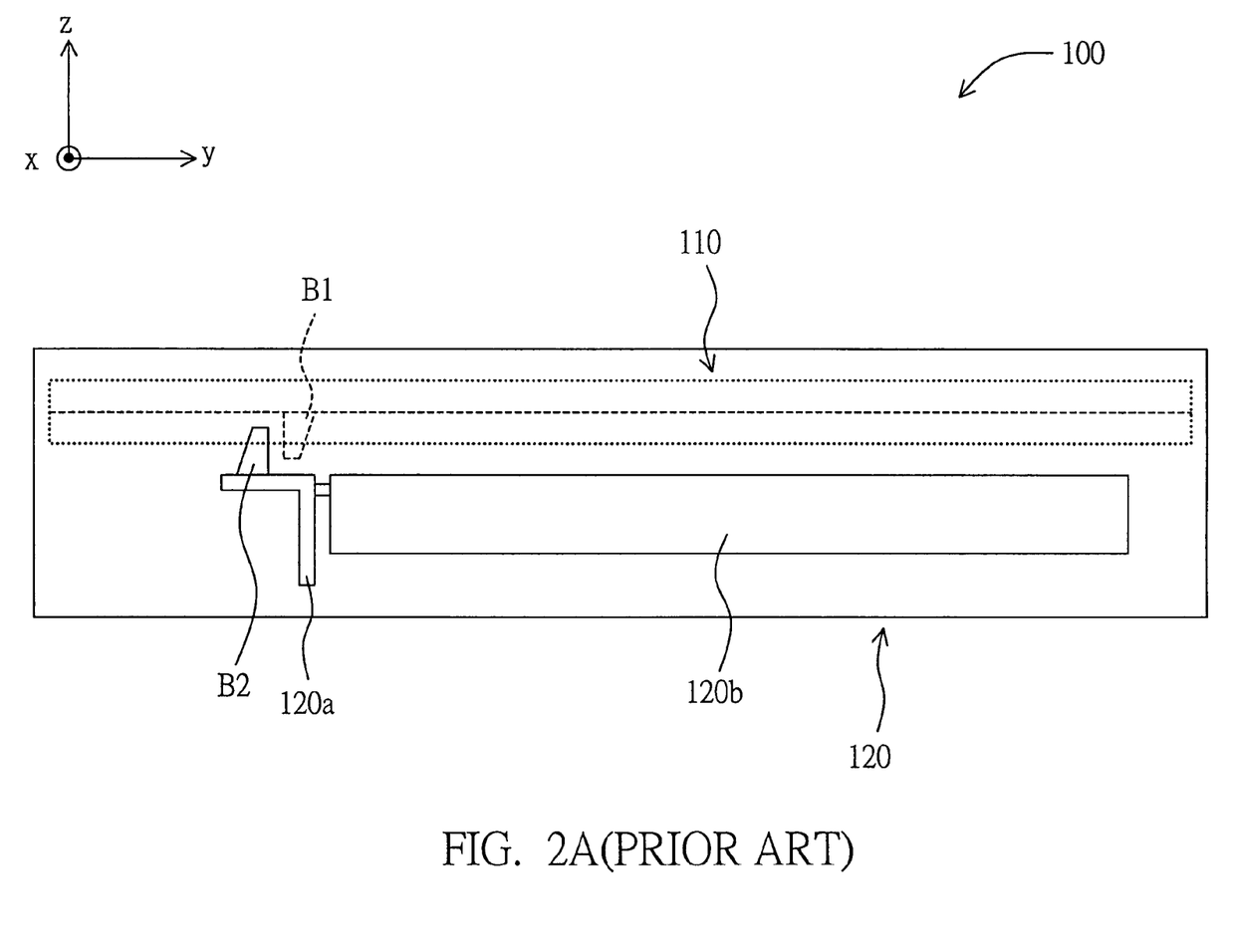
FIG. 2A is a schematic diagram showing that the tray in FIG. 1 is situated in the body.

Please refer to FIG. 2A, which is a schematic diagram showing that the tray in FIG. 1 is situated in the body. As shown in FIG. 2A, the protrudent blocks B1 and B2 abut against each other and are at the same x axis position, and then a fastening relation can be generated to protect the tray 110 from ejecting from the body 120 toward the −y direction to assure the safety of the optical disk and the normal operation of the principal axis motor 120b1, the optical reading head 120b2 and other relative mechanisms when the optical disk is read.

However, if an improper overlarge external force (for example, the optical disk explodes) is applied to the tray 110, the protrudent block B1 may be given a force to push against the protrudent block B2, and the protrudent block B2 or the raiser 120a may have displacement or deformation (for example, the raiser 120a may slope towards the −y direction), or even the tray 110 is given an acting force along +z direction, all the above may cause the protrudent block B1 to get over the protrudent block B2 and to be separated from the body 120.

Figure 2B:
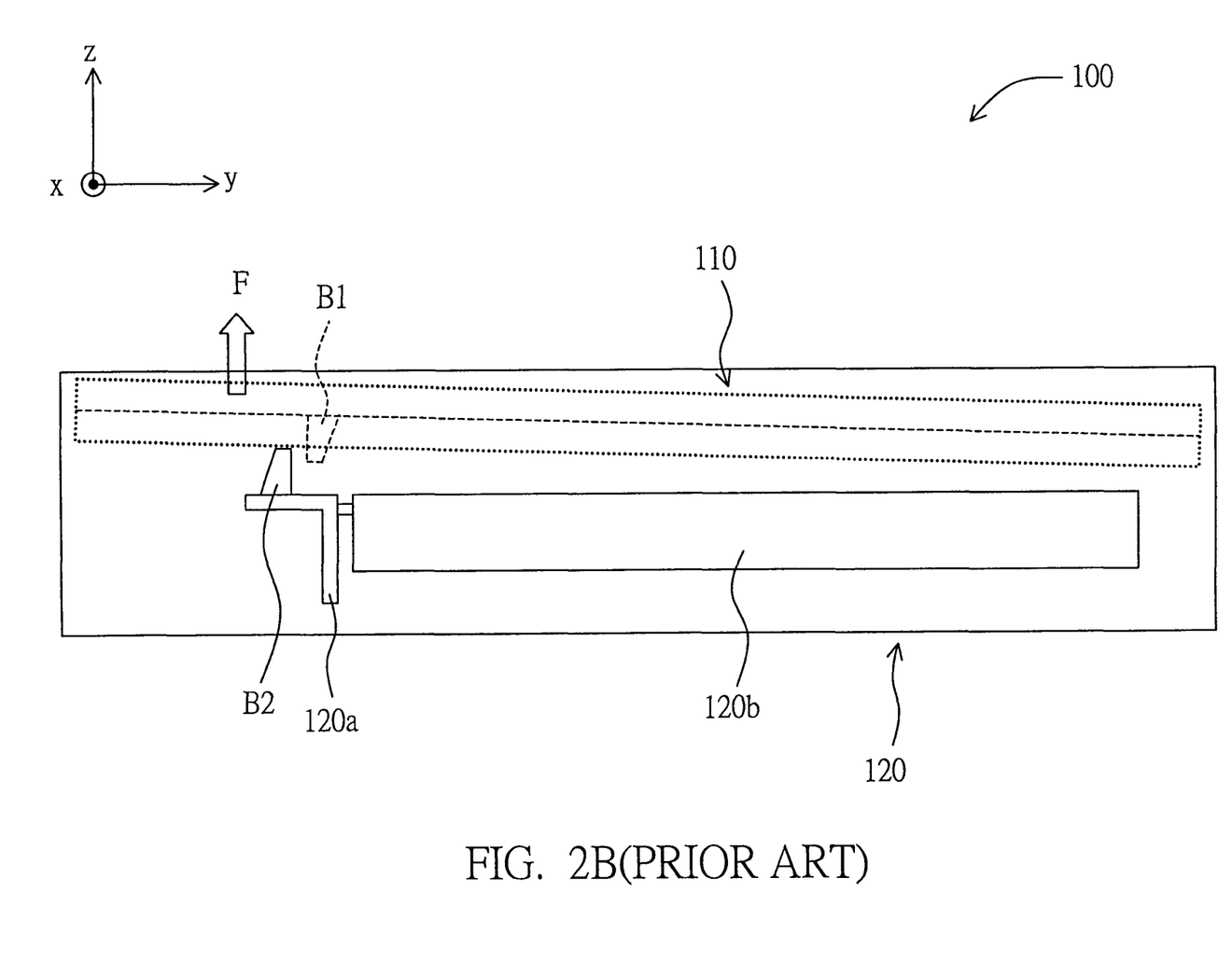
FIG. 2B is a schematic diagram showing the situation that the two protrudent blocks shown in FIG. 2A are separated from each other along the z axis.

Please refer to FIG. 2B, which is a schematic diagram showing the situation that the two protrudent blocks shown in FIG. 2A are separated from each other along the z axis. In the FIG. 2B, if an acting force F along +z direction is applied to the tray 110, compared with the FIG. 2A, the protrudent block B1 and the protrudent block B2 are separated from each other along the z axis, and the fastening range is greatly decreased, so that the protrudent block B1 can easily get over the protrudent block B2.

In addition, the protrudent block B2 also can be provided at the traverse 120b to achieve the design of fastening with the protrudent block B1, but the above problem also exists.

BRIEF SUMMARY OF THE INVENTION

The objective of the invention is to provide an optical disk drive which utilizes the fastening structure design which can restrict the displacement of the tray in the body along a vertical direction to make the tray steadily situated in the body and avoid the conventional problems.

According to the objective of the invention, an optical disk drive including a body, a tray, a first fastening structure and a second fastening structure is provided. The body includes an opening. The tray is coupled to the body and is movable at the opening. The first fastening structure is provided at the body, and the second fastening structure is provided at the tray. When the tray is situated at the body, the first fastening structure and the second fastening structure are correspondingly fastened with each other to restrict the displacement of the tray in the body along a vertical direction.

According to the objective of the invention, an optical disk drive including a body, a tray, a first fastening structure and a second fastening structure is provided. The body includes an opening. The tray is coupled to the body and is movable at the opening. The first fastening structure is provided at the body and has first hook. The second fastening structure is provided at the tray and has a second hook. When the tray is situated in the body, the first hook and the second hook are correspondingly fastened with each other to restrict the displacement of the tray in the body along a vertical direction.

These and other features, aspects, and advantages of the present invention will become better understood with regard to the following description, appended claims, and accompanying drawings.

DETAILED DESCRIPTION OF THE EMBODIMENTS

Figure 3:
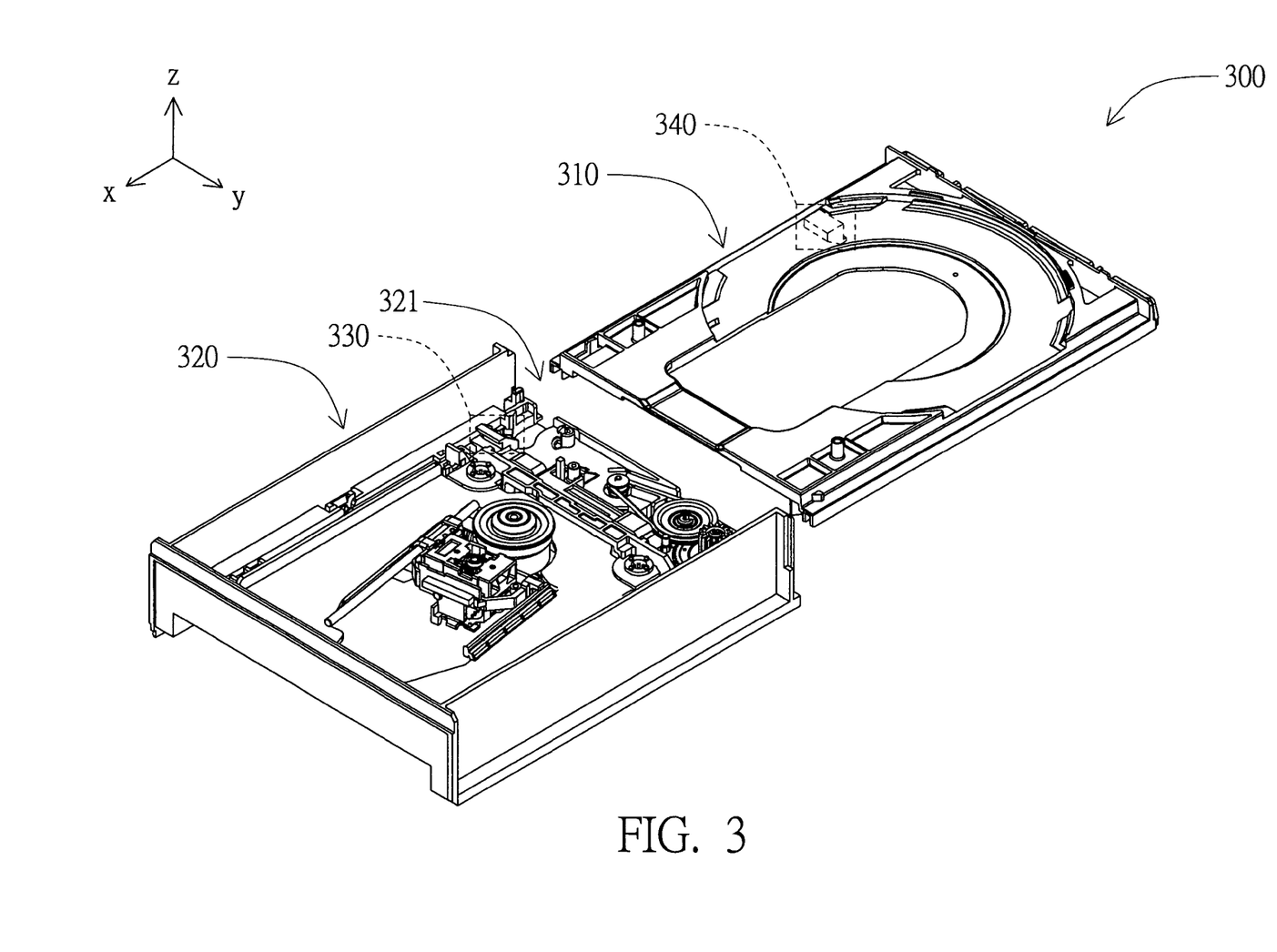
FIG. 3 is a structural schematic diagram showing a part of an optical disk drive according to a preferred embodiment of the invention.

Please refer to FIG. 3, which is a structural schematic diagram showing a part of an optical disk drive according to a preferred embodiment of the invention. An optical disk drive 300 includes a body 320, a tray 310, a first fastening structure 330 and a second fastening structure 340. The body 320 includes an opening 321. The tray 310 is coupled to the body 320 and is movable at the opening 321. That is, the tray 310 can enter in the body 320 or be ejected from the body 320 along a parallel direction of the body 320 (x axis direction) as stated above. The first fastening structure 330 is provided at the body 320, and the second fastening structure 340 is provided at the back of the tray 310 (shown by the dotted line). When the tray 310 is situated in the body 320, the first fastening structure 330 and the second fastening structure 340 can be correspondingly fastened with each other to restrict the displacement of the tray 310 in the body 320 along a vertical direction (z axis direction), which is described hereinbelow in detail.

Figure 4:
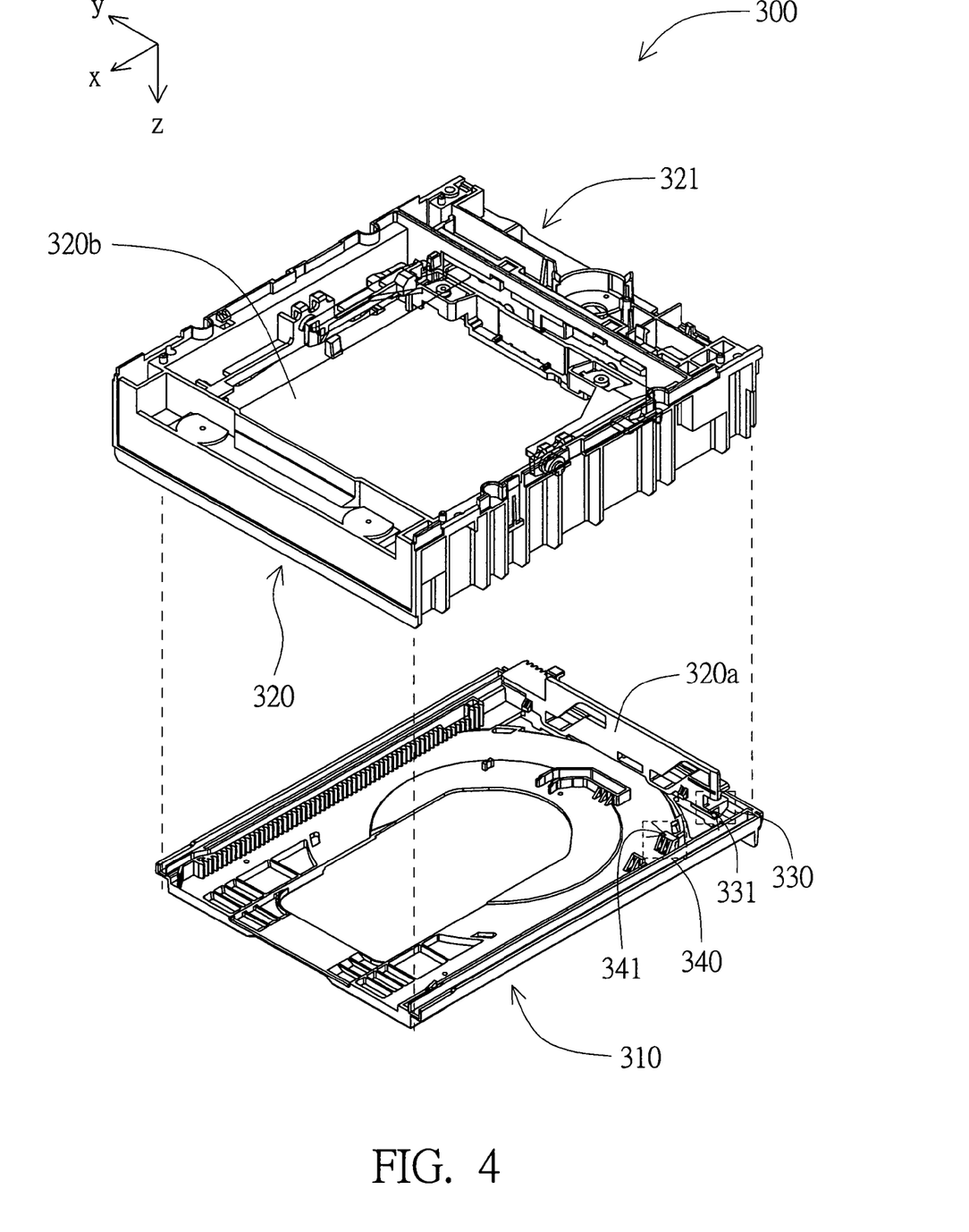
FIG. 4 is an exploded diagram showing the optical disk drive shown in FIG. 3.

Please refer to FIG. 4, which is an exploded diagram showing the optical disk drive shown in FIG. 3. The body 320 further includes a movable part 320a and a traverse 320b. In the embodiment, the movable part 320a is a raiser and provided between the traverse 320b and the opening 321 of the body 320 (the position of the movable part 320a is similar to that of the raiser 120a shown in FIG. 1). To make the description more conveniently, FIG. 4 shows the relative configuration relationship of the movable part 320a and the tray 310 when the tray 310 is situated in the body 320. In addition, the first fastening structure 330 can be provided at the movable part 320a. The first fastening structure 330 has a first hook 331, and the second fastening structure 340 as a second hook 341.

Similarly, the movable part 320a can cooperate with the move of the tray 310 to move horizontally right and left synchronously (that is, parallel to the y axis) by the relative driving mechanism. The side of the traverse 320b which is coupled to the movable part 320 can correspondingly move up and down via the guiding track design of the movable part 320a. When the tray is situated in the body 320, the movable part 320a is at the position shown in FIG. 4, and the first fastening structure 330 and the second fastening structure 340 have the same y axis position, and the first hook 331 and the second hook 341 are correspondingly fastened with each other, so that the first fastening structure 330 and the second fastening structure 340 can be fastened with each other. On the contrary, when the tray 310 is ejected from the body 320 (−x direction), the traverse 320b and the movable part 320a correspondingly swing upward (−z direction) and move rightward (−y direction), respectively, so that the first hook 331 and the second hook 341 are separated from each other.

Figure 5A:
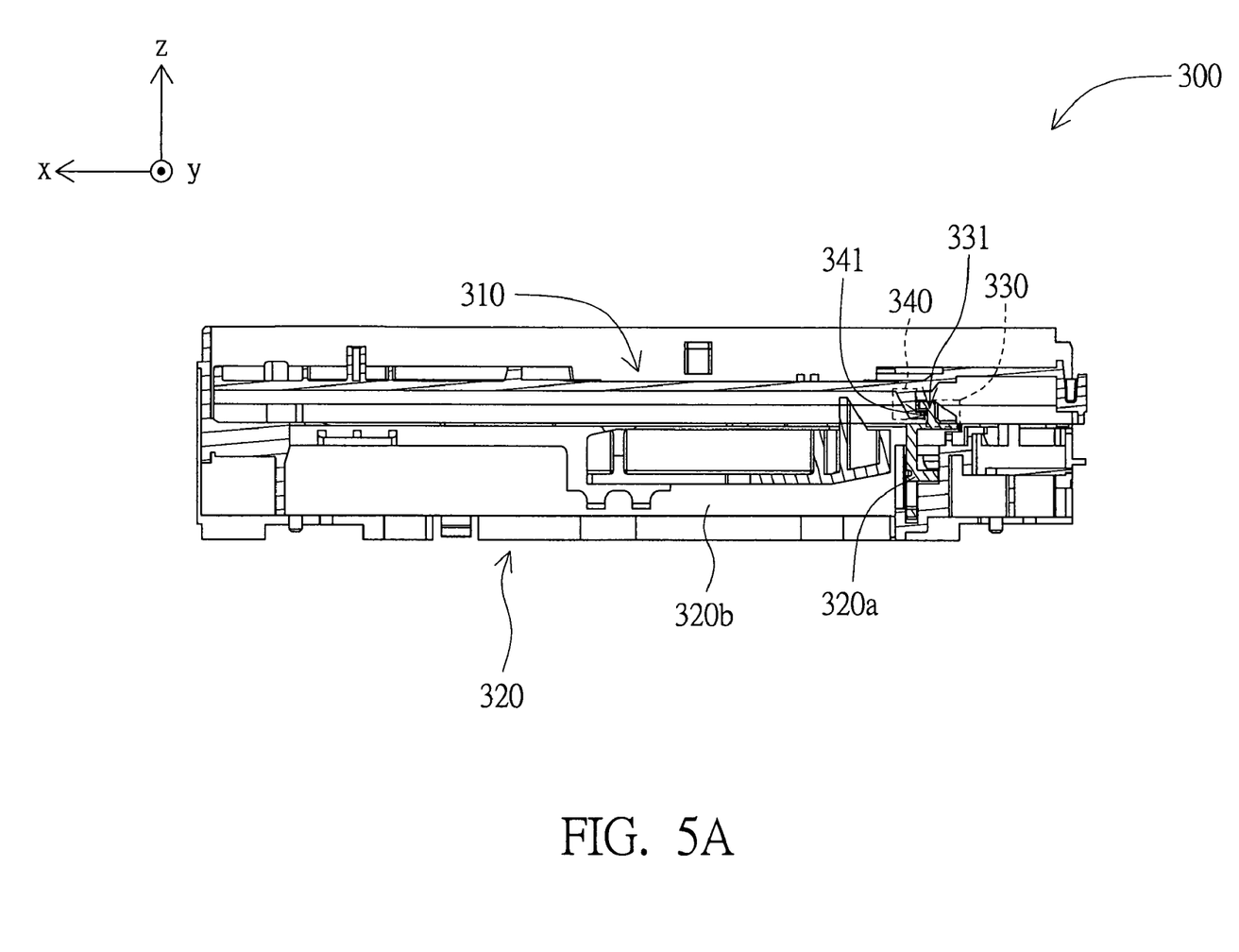
FIG. 5A is a schematic diagram showing the situation that first hook and the second hook are fastened with each other correspondingly when the tray shown in the FIG. 4 is situated in the body.

Please refer to FIG. 5A, which is a schematic diagram showing the situation that first hook and the second hook are fastened with each other correspondingly when the tray shown in the FIG. 4 is situated in the body. As stated above, the first hook 331 and the second hook 341 are not only at the same y axis position, and the first hook 331 is also above the second hook 341. If an improper overlarge external force (such as the explosion of the optical disk drive) is applied to the tray 310, the second fastening structure 340 on the tray 310 also pushes against the first fastening structure 330 like that in the conventional technology. As shown in the FIG. 5A, at that moment, the first hook 331 and the second hook 341 which are fastened with each other correspondingly can restrict the displacement of the tray 310 in the body 320 along the horizontal direction to avoid the ejection of the tray 310 along −x direction.

Figure 5B:
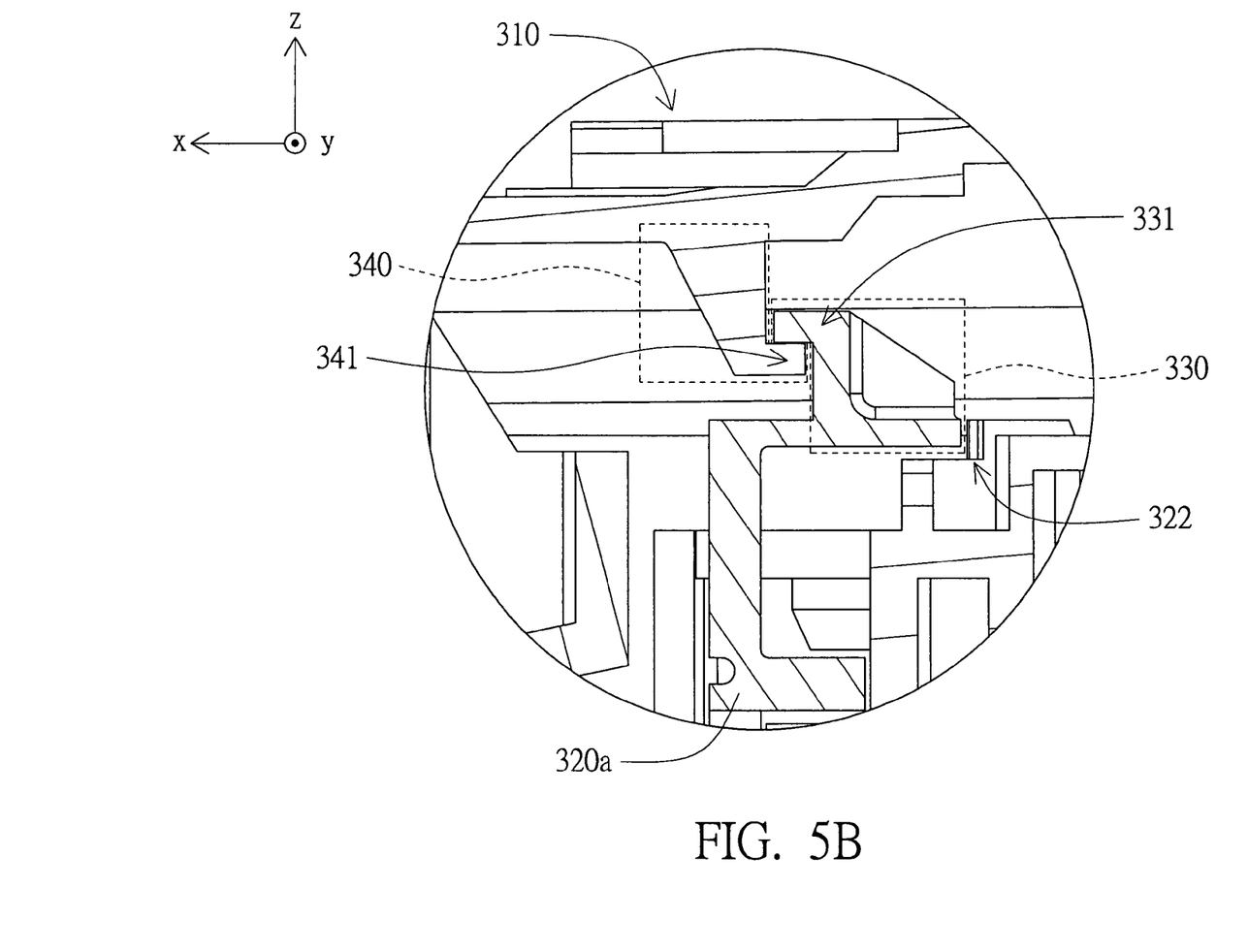
FIG. 5B is a partial schematic diagram showing that an acting force along +z direction is applied to the tray shown in FIG. 5A.

Please refer to FIG. 5B, which is a partial schematic diagram showing that an acting force along +z direction is applied to the tray shown in FIG. 5A. If the second fastening structure 340 pushes against the first fastening structure 330 by an overlarge force, or another acting force toward +z direction is applied to the tray 310, as shown in the FIG. 5B, the first hook 331 tightly hooks the second hook 341, so that the tray 310 cannot continuously move upward, and the displacement of the tray 310 in the body 320 along the vertical direction is restricted to avoid that the first fastening structure 330 and the second fastening structure 34 are separated from each other to make the tray 310 ejected toward the −x direction.

In addition, as shown in FIG. 5B, the body 320 further has a withstanding portion 322. The withstanding portion 322 is formed at the y axis position which is corresponding to the second fastening structure 340, so that when the tray 310 is situated in the body 320, and the movable part 320a moves to the position shown in FIG. 4, the first fastening structure 330 is between the second fastening structure 340 and the withstanding portion 322 and abuts against the withstanding portion 322. That is, the bottom edge of the first fastening structure 330 is corresponding to the concave edge of the withstanding portion 322. In this way, if an overlarge pushing force (from the second fastening structure 340) toward −x direction is applied to the first fastening structure 330, and the first fastening structure 330 deforms, the withstanding portion 322 restricts the sloping value of the first fastening structure 330 along the clockwise direction, so that the first hook 331 and the second hook 341 will not be separated from each other and are fastened with each other tightly.

Certainly, people having ordinary skills in the art also know that the technology of the invention is not limited in the above embodiment. First, in the preferred embodiment, the first fastening structure is, for example, a movable part which is a raiser provided in the body, but in other embodiments, according to the actual design of the body of the optical disk drive, it can be others as long as the first fastening structure can be provided on a fastening position corresponding to the second fastening structure on the tray when the tray is situated in the body (for example, the first fastening structure can be provided at the traverse). The first fastening structure and the second fastening structure also can be integrally formed at the movable part and the tray, respectively. In the embodiment, the two hook edges of the first hook and the second hook which are opposite to each other are, for example, parallel to the parallel direction in the body (that is, parallel to the x axis), but they are also various according to the fastening position design of the first fastening structure and the second fastening structure. Certainly, the size and amount of the hooks are also not limited. In addition, although the fastening structures in the embodiment are fastened with each other by fastening the two corresponding hooks, as long as other fastening structures can restrict the displacement of the tray in the body along the vertical direction, they are within the scope of the invention.

The optical disk drive disclosed by the above embodiment of the invention utilizes two fastening structures which are fastened with each other to restrict the displacement of the tray in the body along the vertical direction, so that the tray can be situated in the body steadily. Thus, if the optical disk explodes in running, it can be assured that the tray will not be ejected from the body to hurt the users.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An optical disk drive comprising:
   a body comprising an opening and a withstanding portion;
   a tray which is coupled to the body and movable at the opening;
   a first fastening structure provided at the body; and
   a second fastening structure provided at the tray, wherein when the tray is situated in the body, the first fastening structure and the second fastening structure are correspondingly fastened with each other to restrict a displacement of the tray in the body along a vertical direction, and the first fastening structure is between the second fastening structure and the withstanding portion and abuts against the withstanding portion.

2. The optical disk drive according to claim 1, wherein the first fastening structure has a first hook, and the second fastening structure has a second hook, and the first fastening structure and the second fastening structure are correspondingly fastened with each other by correspondingly fastening the first hook with the second hook.

3. The optical disk drive according to claim 2, wherein the body further comprises a movable part on which the first fastening structure is provided, and when the tray is situated in the body, the movable part is provided at a position to make the first hook and the second hook correspondingly fastened with each other, and when the tray is ejected from the body, the movable part moves away from the position to make the first hook separated from the second hook.

4. The optical disk drive according to claim 3, wherein the moving direction of the movable part is perpendicular to a moving direction of the tray in the body.

5. The optical disk drive according to claim 3, wherein when the movable part is at the position, the first fastening structure is between the second fastening structure and the withstanding portion and abuts against the withstanding portion.

6. The optical disk drive according to claim 3, wherein the movable part is a raiser.

7. The optical disk drive according to claim 3, wherein the first fastening structure and the movable part are integrally formed.

8. The optical disk drive according to claim 1, wherein the second fastening structure and the tray are integrally formed.

9. The optical disk drive according to claim 1, wherein when the first fastening structure and the second fastening structure are correspondingly fastened, a displacement of the tray in the body along a horizontal direction is further restricted.

* * * * *